United States Patent
Iwata

(10) Patent No.: US 6,824,161 B2
(45) Date of Patent: Nov. 30, 2004

(54) REMOTE CONTROL DEVICE AND BABY CARRIAGE WITH THE SAME

(75) Inventor: Katsuhiro Iwata, Saitama (JP)

(73) Assignee: Combi Corporation, Tokyo (JP)

( * ) Notice: Subject to any disclaimer, the term of this patent is extended or adjusted under 35 U.S.C. 154(b) by 148 days.

(21) Appl. No.: 10/216,861

(22) Filed: Aug. 13, 2002

(65) Prior Publication Data

US 2003/0034211 A1 Feb. 20, 2003

(30) Foreign Application Priority Data

Aug. 17, 2001 (JP) ........................................ 2001-248062

(51) Int. Cl.$^7$ ................................................ B62B 7/08
(52) U.S. Cl. .................. 280/642; 280/655.1; 74/501.6; 74/526
(58) Field of Search ................................. 280/642, 647, 280/650, 648, 658, 655.1, 47.36, 47.371, 47.38, 47.25, 47.39, 657; 74/526, 108, 501.6, 506, 502, 551.3

(56) References Cited

U.S. PATENT DOCUMENTS

| | | | | |
|---|---|---|---|---|
| 4,832,361 A | * | 5/1989 | Nakao et al. ................ | 280/642 |
| 5,511,441 A | * | 4/1996 | Arai .......................... | 74/501.6 |
| 5,524,503 A | * | 6/1996 | Ishikura ...................... | 74/501.6 |
| 5,535,483 A | * | 7/1996 | Jane Cabagnero ........... | 16/429 |
| 6,068,284 A | * | 5/2000 | Kakuda ...................... | 280/642 |
| 6,129,373 A | * | 10/2000 | Cheng ........................ | 280/647 |
| 6,339,862 B1 | * | 1/2002 | Cheng ........................ | 16/113.1 |
| 6,422,587 B1 | * | 7/2002 | Yamazaki et al. ........... | 280/647 |
| 6,443,479 B2 | * | 9/2002 | Huang ........................ | 280/642 |
| 6,478,328 B1 | * | 11/2002 | Yeh et al. .................... | 280/650 |
| 6,485,216 B1 | * | 11/2002 | Cheng ........................ | 403/102 |
| 6,561,536 B2 | * | 5/2003 | Suzuki ........................ | 280/642 |
| 2002/0121766 A1 | * | 9/2002 | Suzuki ........................ | 280/647 |
| 2002/0125688 A1 | * | 9/2002 | Yamazaki et al. ........... | 280/642 |
| 2003/0030250 A1 | * | 2/2003 | Suga et al. .................. | 280/642 |
| 2003/0071441 A1 | * | 4/2003 | Yeh ............................. | 280/642 |

FOREIGN PATENT DOCUMENTS

| | | |
|---|---|---|
| JP | 4-67570 | 6/1992 |
| JP | 7-22882 | 4/1995 |

* cited by examiner

Primary Examiner—Christopher Ellis
Assistant Examiner—J. Allen Shriver
(74) Attorney, Agent, or Firm—Westerman, Hattori, Daniels & Adrian, LLP

(57) ABSTRACT

A remote control device 1 simplified in construction and with an improved usability and a baby carriage 100 possessed of the device 1 are disclosed. The remote control device 1 is connected via wire cables 2 and 3 to a folding and a handle switching mechanism 111 and 112. A pair of pulleys 10a and 10b rotatably supported by a support shaft 4 are rotated by a rotary plate 20 so as to wind the wire cables 2 and 3 thereon, respectively. The rotary plate 20 is rotatably supported between the pulleys 10a and 10b. A switching plate 40 is operated to select one of the pulleys 10a and 10b representative of a selected one of the folding and handle switching mechanisms. The switching plate 40 drives said rotary plate to assume a pre-established rotational angular position at which the rotary plate is capable of actuating and then rotating a selected one pulley 10a or 10b. A control lever 30 stroke-movable is operated to rotationally drive the rotary plate 20 from the pre-established angular position, thereby rotating the selected one pulley.

10 Claims, 15 Drawing Sheets

REMOTE CONTROL DEVICE AND BABY CARRIAGE WITH THE SAME

BACKGROUND OF THE INVENTION

1. Field of the Invention

The present invention relates to a remote control device for controlling a locking/unlocking mechanism, and a baby carriage designed to travel while carrying an infant, the baby carriage being possessed of such a remote control device.

2. Description of the Prior Art

In the baby carriage used for taking an infant out for a stroll or the like, there have been various improvements proposed and put to practical use. They include one foldable to make the carriage handy to carry and to make it convenient for storage, and one that makes the push handle switchable in position between the seat backrest and the facing sides. These controllable means, namely a folding and a switching mechanism, are commonly designed to be locked and unlocked using a remote control device mounted at the push handle.

As disclosed in, e.g., JP U H07-22882 A, the present applicant has already proposed such an improved remote control device in which a pair of pulleys for rotation by a pair of control levers are mounted to a frame and a lock plate is slidably placed on the top surface of the frame, wherein the lock plate is used to select one or the other of these open/close control levers in controlling one or the other of these two controllable mechanisms, thereby permitting the same to be selectively controlled.

Requiring the two control levers for the two pulleys, one control lever for one pulley and the other control lever for the other pulley, each directly, however, makes the prior device complicated in makeup. In addition, the prior device requires considerable force for rotating the pulley with the control lever and hence has left much to be desired in its manipulability as well.

SUMMARY OF THE INVENTION

It is accordingly an object of the present invention to provide an improved remote control device which is simplified in makeup and effectively improved in usability.

It is another object of the present invention to provide a baby carriage possessed of such an improved remote control device.

In order to achieve the fist object mentioned above, there is provided in accordance with the present invention a remote control device connected to controllable means via wire cable means for locking and unlocking the controllable means, characterized in that the said device is applicable to at least two independent controllable members and includes a single control means adapted to selectively lock and unlock the said independent controllable members.

A remote control device according to the present invention preferably operable with a pair of wire cables having their respective one ends connected to two separate controllable members, respectively, preferably comprises: a pair of pulleys rotatably supported by a shaft and connected to other ends of the said wire cables, respectively, wherein the said pulleys are alternatively rotatable by a rotary plate and each of the said pulleys when so rotated is adapted to wind thereon an end portion of the wire cable associated therewith; the said rotary plate rotatably supported between the said pulleys coaxially therewith and having a pair of pre-established rotational angular positions assumable thereby and related to the said pulleys, respectively; a switching plate operable to select one of the said pulleys representative of a selected one of the said two independent controllable members, the said switching plate being adapted to drive the said rotary plate to assume one of the said pre-established rotational angular positions at which the said rotary plate is capable of actuating and then rotating the said selected one pulley; and a control lever stroke-movable for rotationally driving said rotary plate from said pre-established angular position, thereby rotating said selected one pulley.

Preferably in the makeup mentioned above, the said rotary plate includes an engagement shaft adapted to engage with the said control lever, and each of the said pulleys includes a projection adapted to engage with the said rotary plate, wherein the said engagement shaft is spaced from a center of rotation thereof by a distance greater than a distance by which the said projection is paced from an axis of rotation thereof.

Further preferably, the said rotary plate is adapted to rotate the said two pulleys in mutually opposite directions, and the said two pulleys are adapted to wind the said wire cables thereon in mutually opposite directions, respectively.

Further preferably, the said two wire cables are each kept taut under tension.

Preferably, the said switching plate is slidably movable bi-directionally and so is the said rotary plate rotatable, in such a manner that the said rotary plate rotatable in a sense determined by a direction in which the said switching plate is moved; the said switching plate is lockable at each of the ends of its two slidable movements; and the said rotary plate has a slide contact segment adapted to unlock the said switching plate locked.

Further preferably, the said switching plate includes a guide projection operable to guide the said control lever when the said switching plate has reached the end of its slidable movement and the said control lever has been shifted to its operable position; and the said guide projection is also operable to engage with the said control lever and thus to be caught thereby when the said switching plate is restoring its normal position.

It is advantageous that the said switching lever be energized by spring means so as to restore its normal position.

It is also advantageous that the said control lever be energized so as to restore its non-operable position.

In order to achieve the second object mentioned above, the present invention also provides a baby carriage having a folding mechanism and a handle switching mechanism as the two independent controllable members, wherein the said folding and handle switching mechanisms are adapted to be locked and unlocked by a remote control device as mentioned above.

As will become more readily apparent hereinafter, according to the present invention a remote control apparatus connected to mutually independent controllable members, e.g., a folding and a handle switching mechanism in a baby carriage in a typical form of embodiment thereof, provides outstanding advantages in its operability. It permits the folding and handle switching mechanisms to be selectively unlocked with the use of a single control lever in combination with a switching plate. Furthermore, making the control lever one component of the device simplifies the device in its makeup. Then, the device is both smooth and to the purpose in operation, and excellent in usability.

Furthermore, setting up a large ratio in torque between the rotary plate and the switching plate on which the torque produced by the control lever when operated is acted, permits the force required in manipulating the control lever to be substantially reduced, which makes the device easy to use and handle.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and understanding thereof.

In the drawings:

FIG. 8 is a front view illustrating the remote control device in which the switching plate in the remote control device is acted on;

FIG. 9 is a perspective view illustrating the remote control device in which the switching plate is acted on;

FIG. 10 is an enlarged perspective view illustrating the remote control device in which the switching plate is acted on;

FIG. 12 is a front view illustrating the remote control device in which the control lever in the remote control device is acted on;

FIG. 13 is a perspective view illustrating the remote control device in which the control lever is acted on;

FIG. 14 is an enlarged perspective view illustrating the remote control device in which the control lever is acted on.

BEST MODES FOR CARRYING OUT THE INVENTION

Hereinafter, an explanation in detail is given in respect of suitable forms of embodiment for a remote control device and a baby carriage with the same according to the present invention, reference being had to the accompanying drawings.

Figure 1:
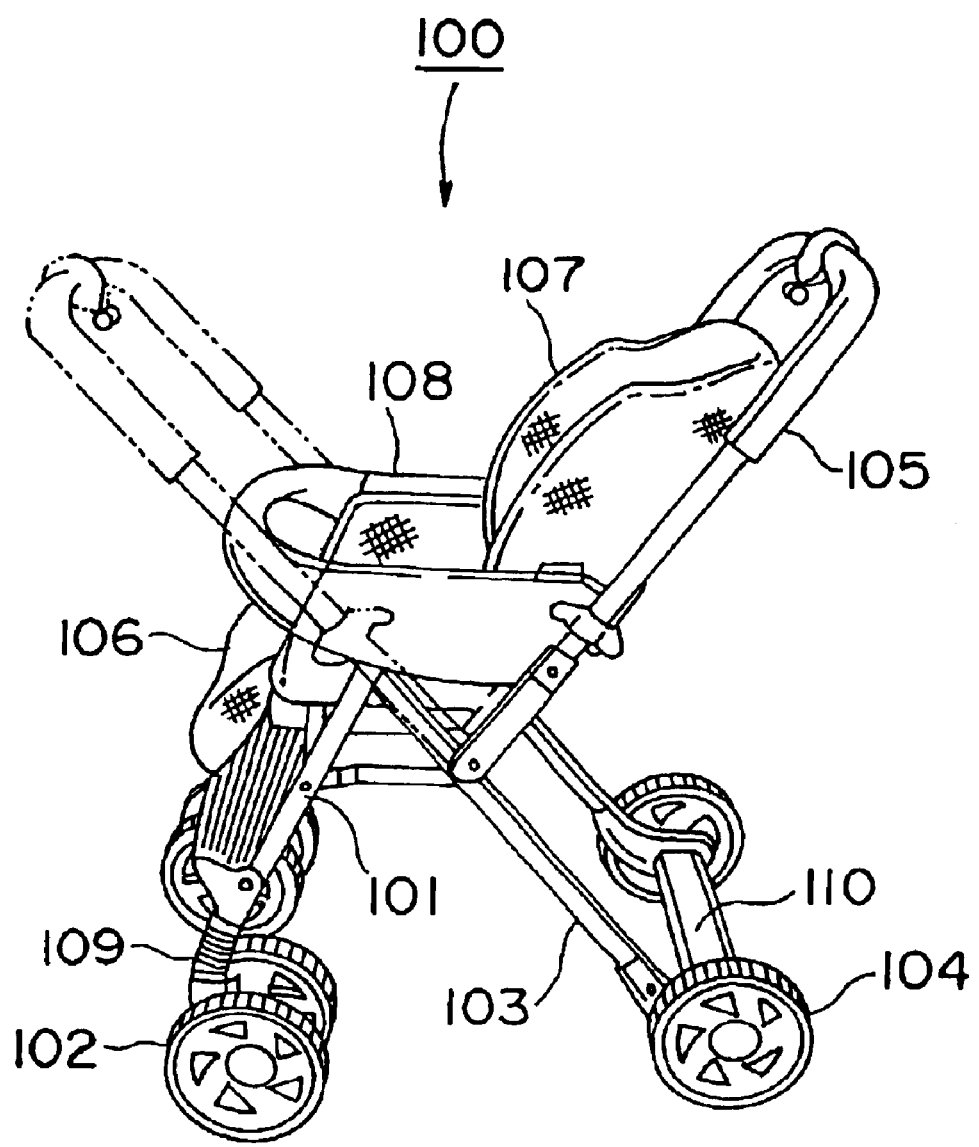
FIG. 1 is a perspective view illustrating a typical makeup of a baby carriage that is possessed of a remote control device according to the present invention.

Mention is first made in general of a typical basic makeup of a baby carriage to which the present invention in one aspect thereof is directed. Referring to FIG. 1, the baby carriage illustrated therein as designated by general reference character 100 includes a right and left hand side pair of front legs 101 each having a front wheel 102, a right and left hand side pair of rear legs 103 each having a rear wheel 104, a push handle 105 shaped generally in the form of character U, and a seat 106, a backrest 107 and a pair of arm rests 108 on and over which an infant is seated. Here, the right and left hand side front wheels 102 are connected to the front legs 101 each by means of a caster mechanism 109 while the right and left hand side rear wheels 104 are connected together by means of a connecting plate or bar 110. It should be noted, however, that this entire makeup is not necessarily a limitation but is illustrative only.

Figure 2:
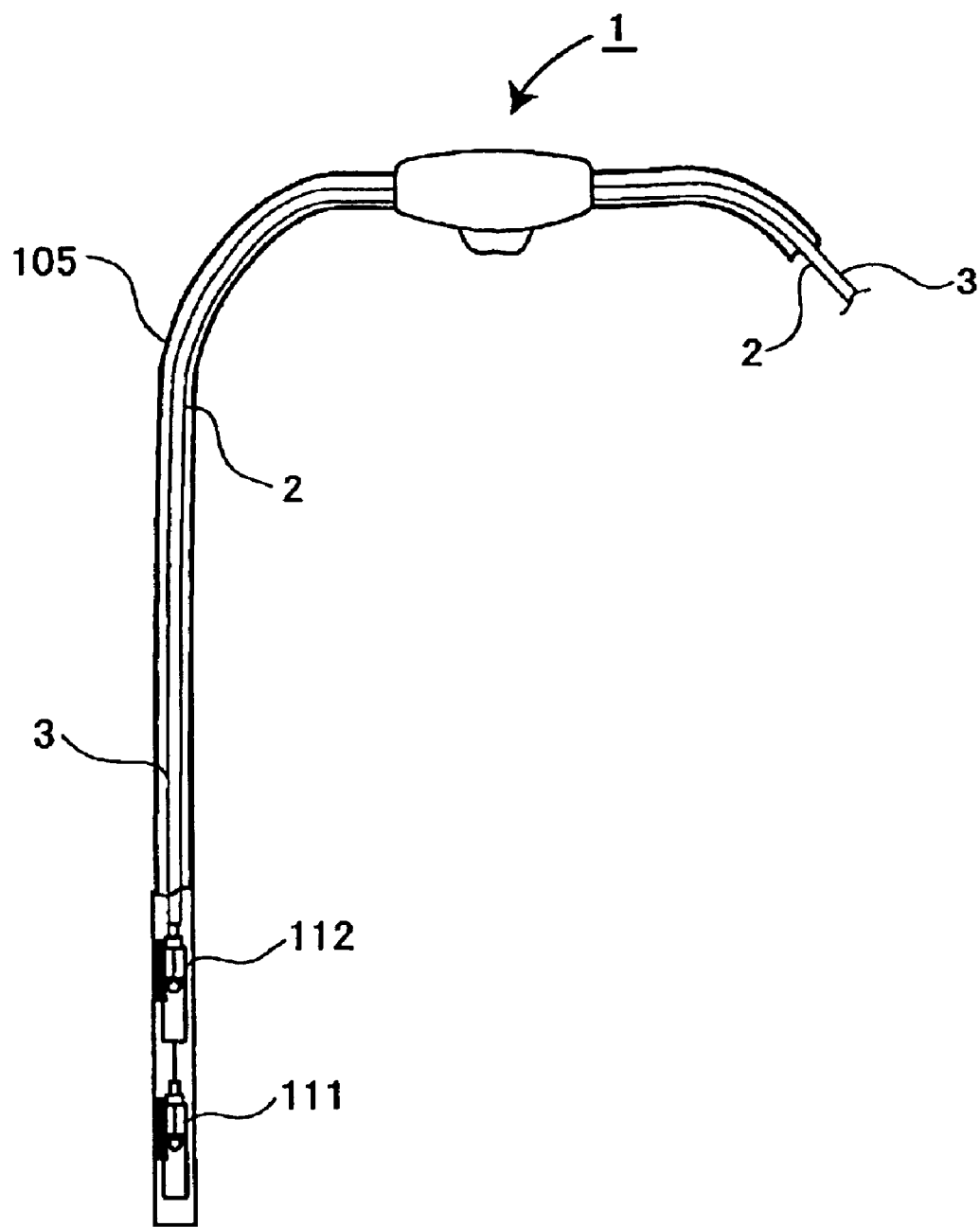
FIG. 2 is a diagrammatic view illustrating the relationship in position between a remote control device attached to the push handle of the baby carriage and controllable members included therein.

The U-shaped push handle 105 is provided at its center with a remote control device 1 of the present invention as illustrated in FIG. 2. The remote control device 1 has two pairs of first and second wire cables 2 and 3 extending from it both rightwards and leftwards and passed through the interior of the push handle 105, although only the one side pair of first and second wire cables 2 and 3 together with one side push handle half 105 is actually shown in FIG. 2. As shown, the first wire cable 2 is connected to a folding mechanism 111 as a controllable means while the second wire cable 3 is connected to a handle switching mechanism 112 as another controllable means. So connected, the first and second wire cables 2 and 3 as will be described below are here so arranged that they are wound on pulleys, thereby locking/unlocking the folding and handle switching mechanisms 111 and 112, respectively. Thus, these mechanisms are so designed that they are each locked when the wire cable 2, 3 is once wound on its respective pulley and is unlocked when the same operation is repeated once.

Figure 3:
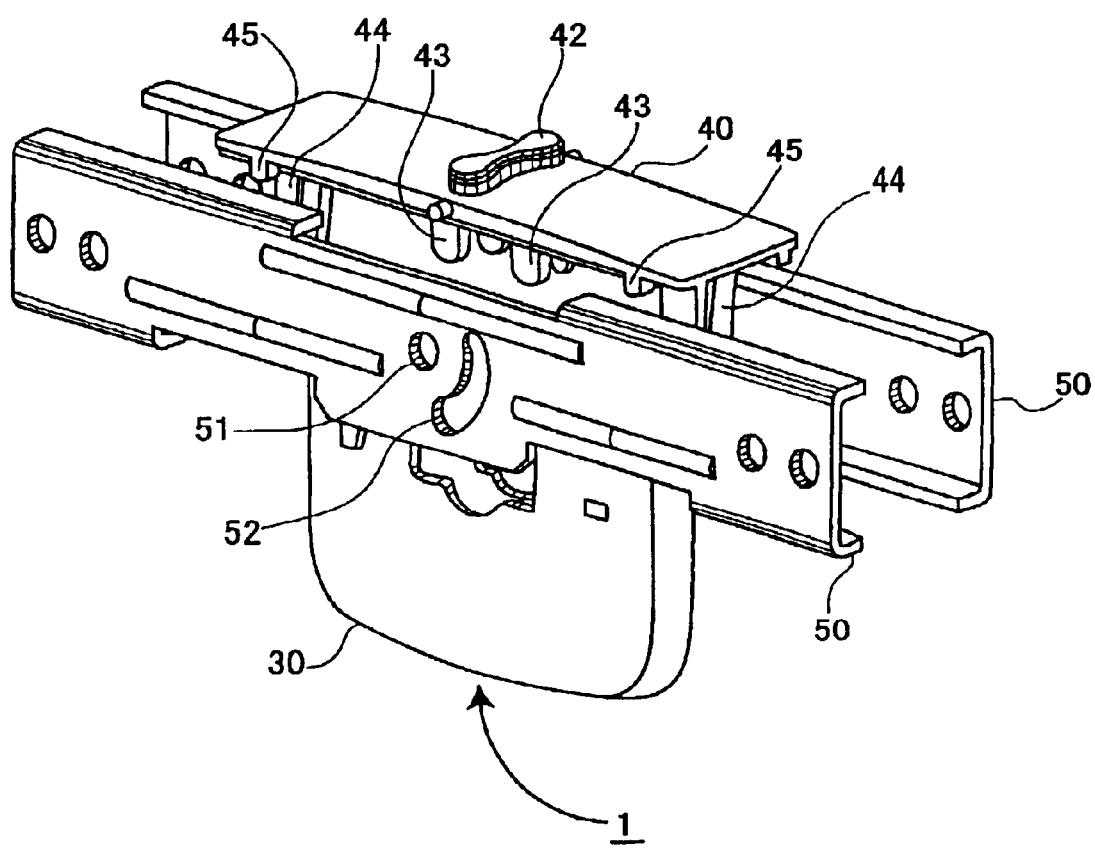
FIG. 3 is a perspective view illustrating the makeup of essential parts of a remote control device according to a typical form of embodiment of the present invention.
Figure 4:
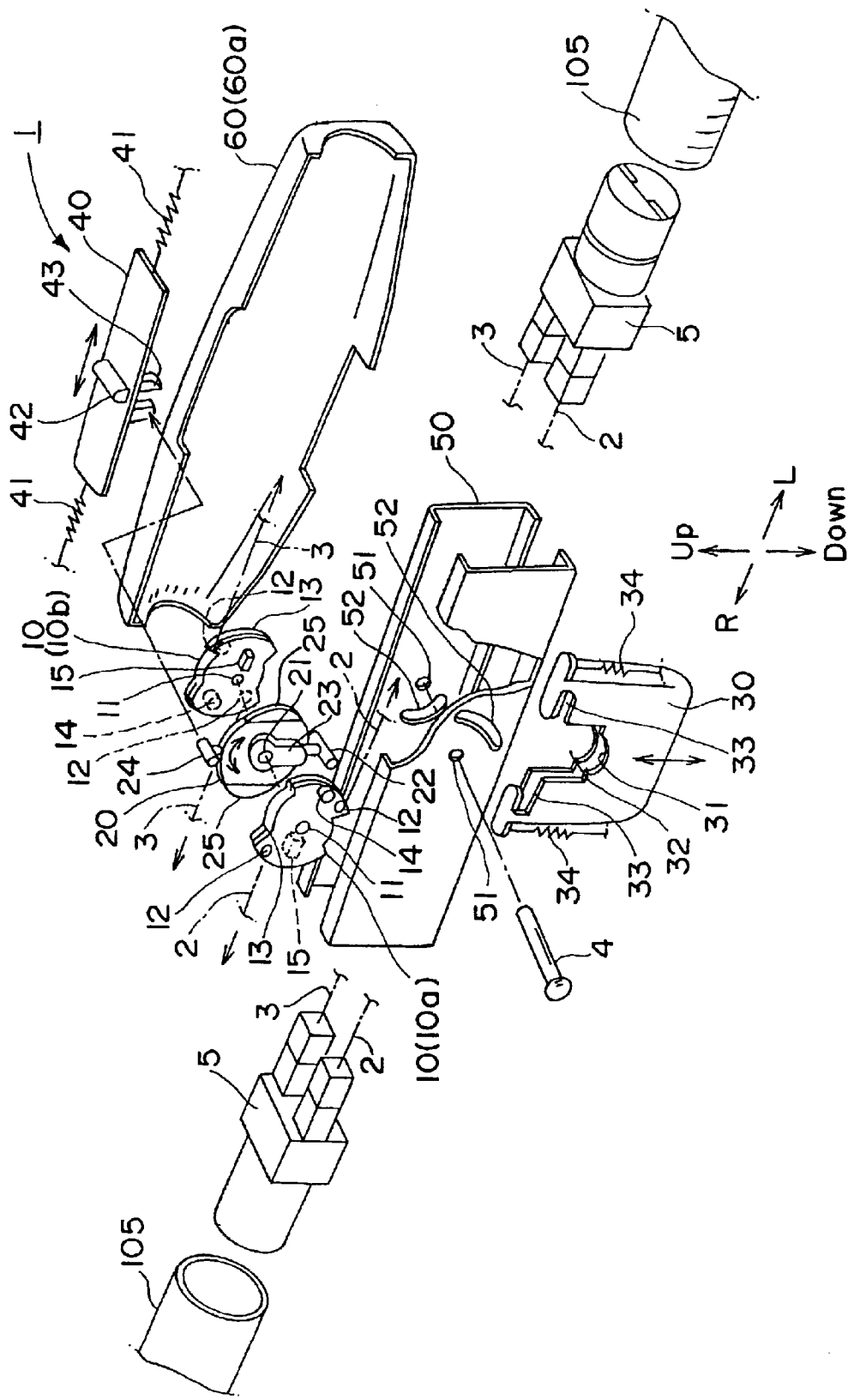
FIG. 4 is a perspective view illustrating the makeup of essential parts decomposed of the remote control device according to a typical form of embodiment of the present invention.

FIGS. 3 and 4 illustratively show how essential parts of the remote control device 1 are made up. As shown, the remote control device 1 includes a pair of pulleys 10 rotatably carried by a support shaft 4 to wind the ends of the wire cables 2 and 3 thereon, respectively; a rotary plate 20 rotatably carried between the two pulleys 10 coaxially therewith to actuate one of the pulleys 10 according to its rotational angular position; a control lever 30 strokemovable to rotationally drive the rotary plate 20; a switching plate 40 for locating and holding the rotary plate 20 at a pre-selected position such that the rotary plate 20 may actuate either of the pulleys.

The pulleys 10, the rotary plate 20, the control lever 30 and the switching plate are preferably each composed of a plastic material.

The pulleys 10 and the rotary plate 20 are accommodated in the inside of a frame 50 formed by a pair of sheet metal frame halves which as shown are each U-shaped in cross section. Each of the push handle halves which together form the push handle 105 is coupled to the remote control device 1 by means of a joint 5 which is fitted into and fastened to the frame halves united together forming the frame 50. The frame 50 united is covered with a covering 60 formed by a pair of covering halves only one of which is shown in FIG. 4 as indicated by 60a.

The two pulleys 10 are each formed with a center hole 11 and are supported by a common support shaft 4 passing through these center holes 11. The support shaft 4 is passed through holes 51 formed in the frame halves 50, thereby bridging across the frame halves 50. One of the pulleys 10, the pulley designated with 10a, is formed with a pair of belaying elements (holes) 12 and 12 which hold therewith (therein) the proximal ends of the wire cables 2 whose distal ends are connected to the two folding mechanisms 111, respectively. The other of the pulleys 10, the pulley lob, is formed with a pair of belaying elements (holes) 12 and 12 which hold therewith (therein) the proximal ends of the wire cables 3 whose distal ends are connected to the two handle switching mechanisms 112, respectively. These belaying elements 12 and 12 for each of the pulleys 10a and 10b are provided located at positions diametrically opposite in each pulley 10 and closer to the periphery thereof. The pulleys 10a and 10b are formed with grooves 13 in which to receive the wire cables 2 and 2; and the wire cables 3 and 3 wound thereon, respectively.

Each pulley 10 has a stopper 14, e. g. in the form of a small columnar projection, formed on the one side surface that is on the side to the side walls of each frame half 50. Here, the stopper 14 on the one or first pulley 10a and the stopper 14 on the other or second pulley 10b are made to lie symmetrically about their center holes 11. These stoppers 14 are designed to engage with guide slots 52 formed in the frame halves 50 to establish the limits of angles of rotation of each pulley 10 to, say, within 90°. Each of the pulleys 10 is pulled from the right and left hand sides by the wire cables 2, 3 kept taut under tension, and in their normal (neutral) state, the pulleys 10a and 10b assume their normal positions shown with their respective stoppers 14 held in contact with the respective ends of the guide slots 52.

The pulleys 10a and 10b have their respective other side surfaces (each facing the rotary plate 20) formed with projections 15 with which a pair of pressing elements 23 formed on the opposite side surfaces of the rotary plate 20 are adapted to engage, respectively. Here, the projection 15 on the pulley 10a and the projection 15 on the pulley 10b are located at positions diametrically symmetrical about the center holes 11. Thus, the pulleys 10a and 10b coaxially aligned with the rotary plate 20 are structured symmetrically about the rotary plate 20 and the center holes 11.

Figure 5:
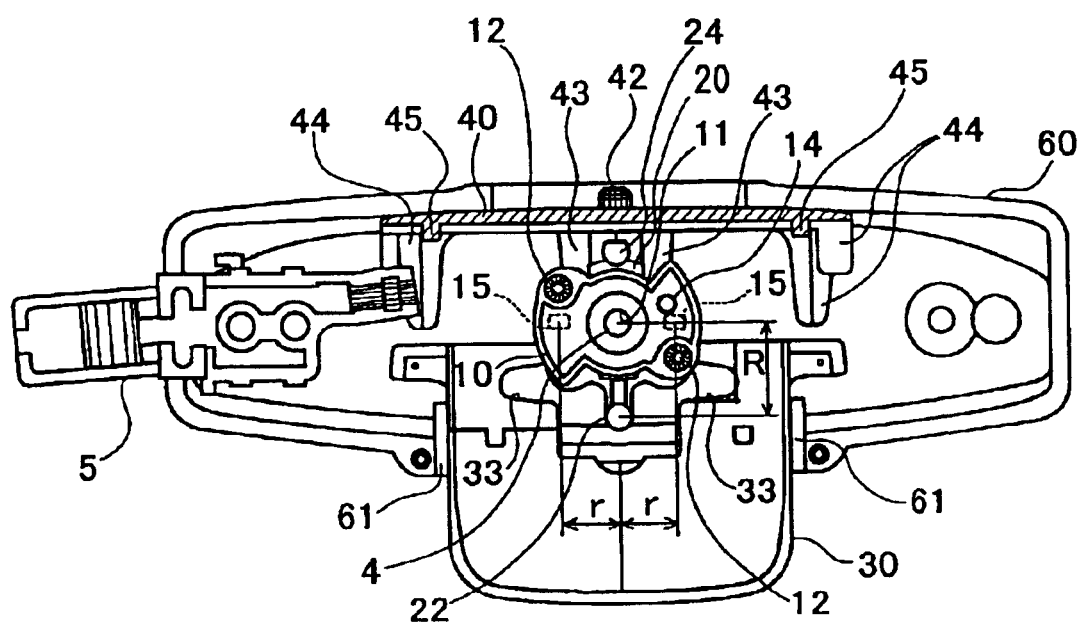
FIG. 5 is a front view illustrating the remote control device in a normal state.

The rotary plate 20 is formed at its center with a hole 21 through which the support shaft 4 passes, and is thus supported by the shaft 4 together with the pulleys 10a and 10b. The rotary plate 20 is shaped generally in the form of a disk and further carries an engagement shaft 22 integrally formed therewith so as to extend parallel to the axial line of the center hole 21 outside of the disk. The engagement shaft 22 as will be described below is designed to engage with an engageable element 33 in a control lever 30 to rotate the rotary plate 20 when the control lever 30 is operated. As shown in FIG. 5, the distance R by which the engagement shaft 22 is spaced from the center of rotation (support shaft 4) of the rotary plate 20 and the distance r by which the projection 15 of each pulley 10 is spaced from its center of rotation are set to satisfy the relationship R>r. While the distances R and r prescribes the magnitudes of the torques which are produced respectively at the engagement shaft 22 of the rotary plate 20 and at the projection 15 of each pulley 10 when the control lever 30 is operated, the ratio R/r as its specific value is concerned is preferably as large as possible to the extent that their sizes and ambient spaces permit.

The pressing elements 23 on the rotary plate 20 are formed rising from its opposite side surfaces radially inwards of the engagement shaft 22 and facing the pulleys 10a and 10b, respectively. The pressing elements 23 are so disposed and positioned that they can press the projections 15 on the pulleys 10a and 10b, respectively.

Mounted further on the rotary plate 20 and extending parallel to the engagement shaft 22 diametrically opposite thereto is a piece of projection 24 provided to control the angular position of the rotary plate 20. The piece of projection 24 is mounted integrally to the rotary plate 20 to lie outside of its disk body and as will be described later is designed to engage with an engagement piece or pieces 43 of a switching plate 40. And, in a normal state the rotary plate 20 is so positioned that its diametric line passing through the engagement axis 22 and the piece of projection 24 is oriented vertical as shown in FIGS. 4 and 5.

The rotary plate 20 further has a pair of crescent segments 25, as a slide contact element which disposed at opposite sides of the diametric line passing through the engagement axis 22 and the piece of projection 24 make the rotary plate 20 generally disk-shaped. These segments 25 may either be formed integrally with the rotary plate 20 or be first formed separately from the rotary plate 20 and then made integral therewith. The crescent segments 25 as will be described later is designed to make a sliding contact with the switching plate 40, thereby unlocking the switching plate 40.

The control lever 30 as shown in FIGS. 4 and 5 is so disposed in the device that it in its normal state projects downwards under the lower portion of a cover or housing 60. The housing 60 is provided with a guide member 61, which guides the control lever 30 so that the control lever 30 may vertically reciprocate with a pre-established stroke. The control lever 30 has its interior 31 hollow, and is thereby made capable of accommodating the rotary plate 20 therein. Also, in order to avoid interference with the pressing elements of the rotary plate 20, there is formed a recess 32.

The control lever 30 also has a pair of horizontally spaced engageable slots 33 with which the engagement shaft 22 of the rotary plate 20 is adapted to engage. With the engagement shaft 22 of the rotary plate 20 made in engagement with the engageable slots 33, ascending the control lever 30 causes its stroke action that then results to be converted into a rotary motion of the rotary plate 20. It should be noted here that the control lever 30 is normally biased downwards by means of a pair of tension springs 34.

The switching plate 40 lies inserted between the cover 60 and the top of the frame 50 so as to be horizontally slidable with a pre-established stroke. The switching plate 40 has at its opposite sides a pair of tension springs 41 connected thereto and to a pair of suitable fixed points on the cover 60 or the frame 50, respectively, to suspend it between those fixed points so that it is normally held at a mid position of its sliding stroke.

Figure 6:
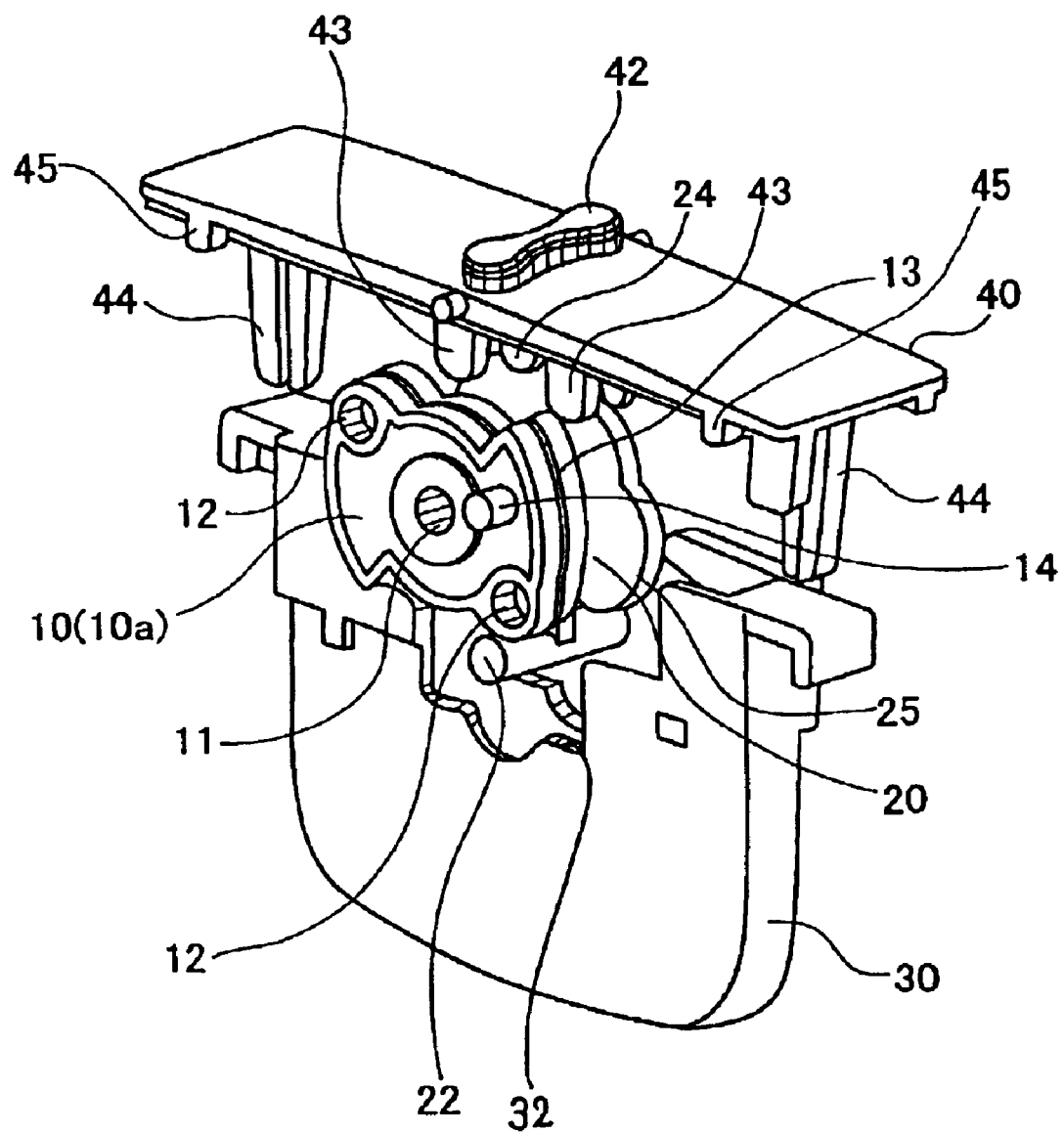
FIG. 6 is a perspective view of the remote control device in a normal state.
Figure 7:
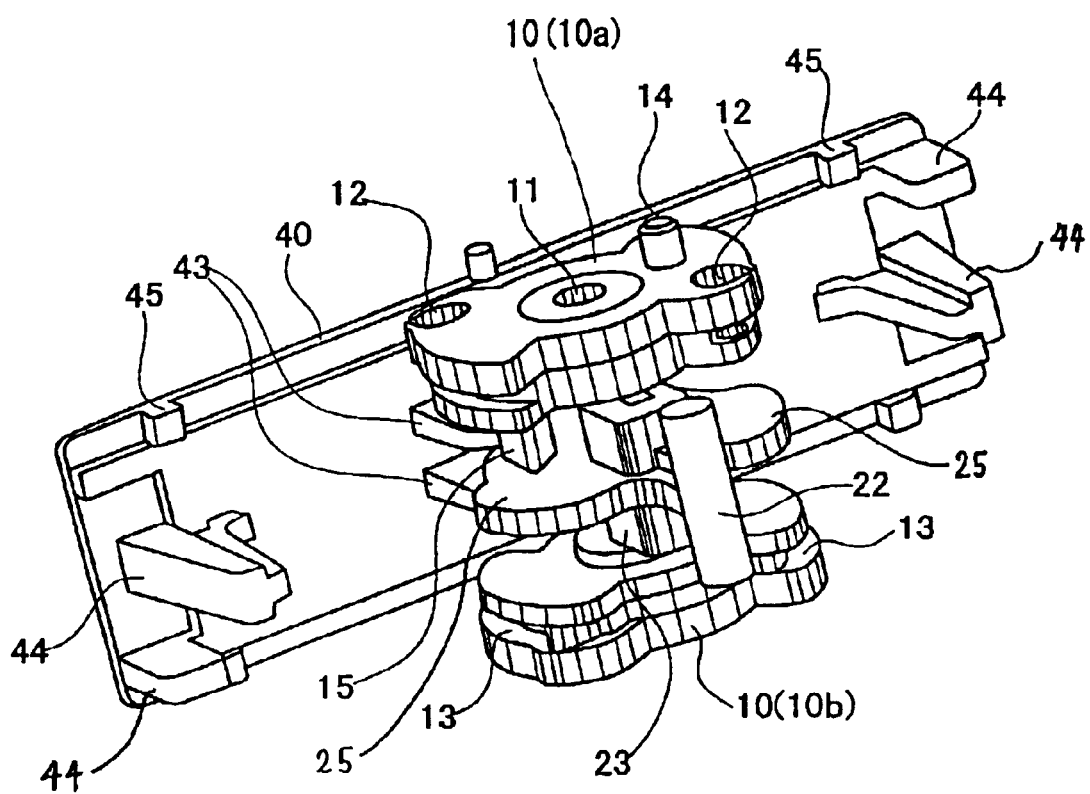
FIG. 7 is a perspective view of the remote control device in a normal state as view from below.

The switching plate 40 has its upper surface formed with a raise 42 as a finger hold for the operator to touch with the thumb or a finger to slide the switching plate 40 from side to side. The switching plate 40 also has its lower surface having the engagement piece or pieces 43 formed thereon, with which the piece of projection 24 of the rotary plate 20 to engage to rotate the rotary plate 20 when the switching plate 40 is slit. In the form of embodiment illustrated, four engagement pieces 43 are mounted lying from side to side of the piece of projection 24. The lower surface of the switching plate 40 as shown in FIGS. 6 and 7 further has a plurality of guide projections 44 suspended therefrom for guiding the control lever 30 as the latter is moved vertically up and down (see FIG. 6).

Mention is next made of an operation of the remote control device 1 which is made up as mentioned above. First in the normal state, i.e., in the normal state of use as shown in FIG. 1, the folding mechanism 111 and the handle switching mechanism 112 are both held locked, which holds the device 1 in the normal state as shown in FIGS. 5 to 7.

Figure 8:
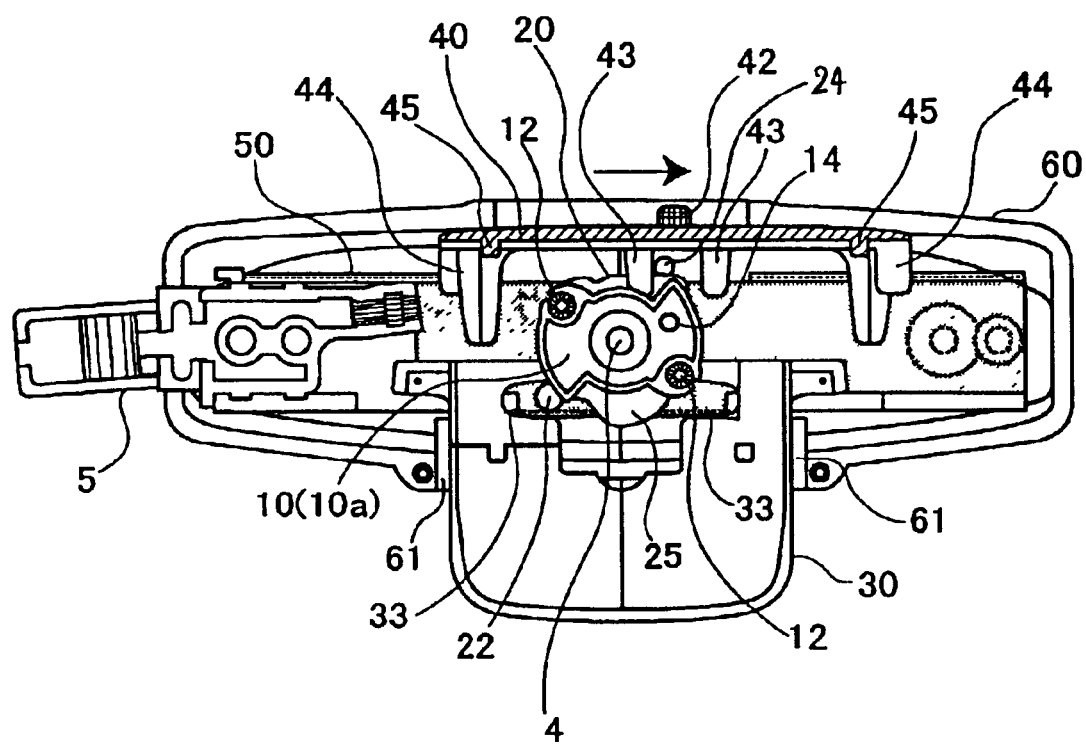
Figure 9:
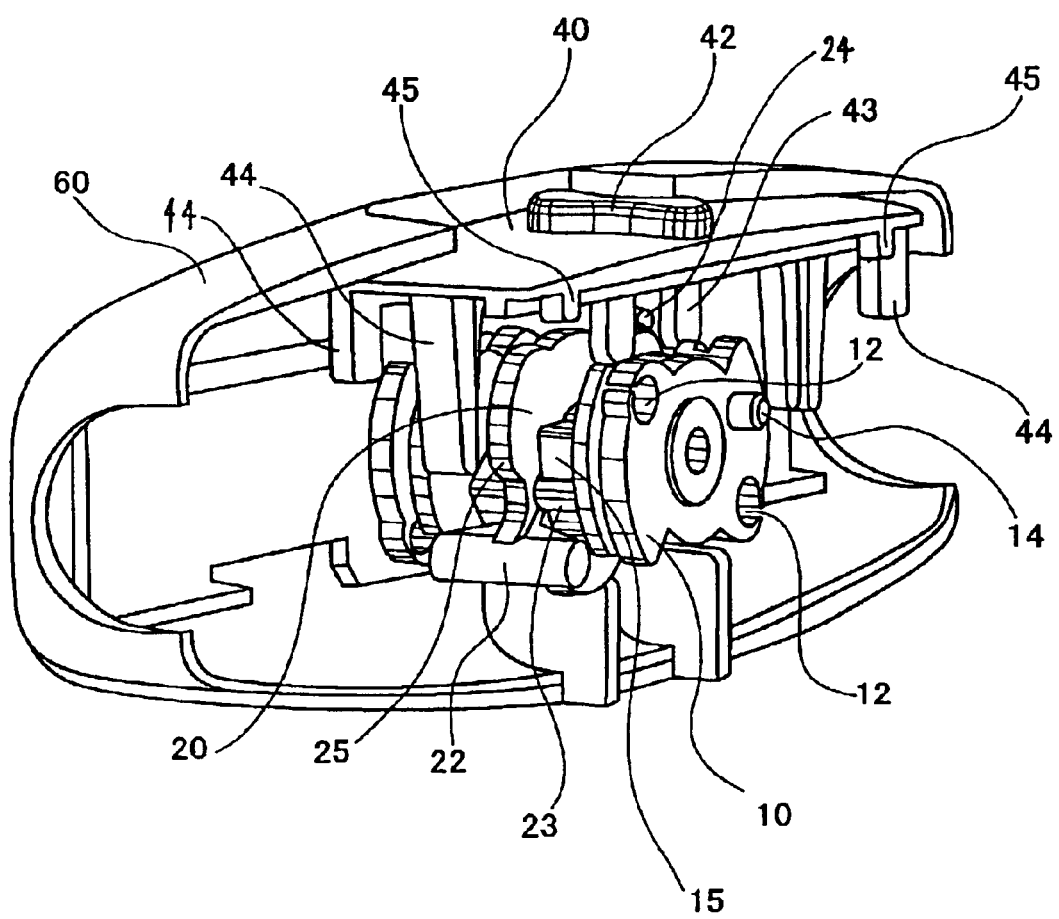
Figure 10:
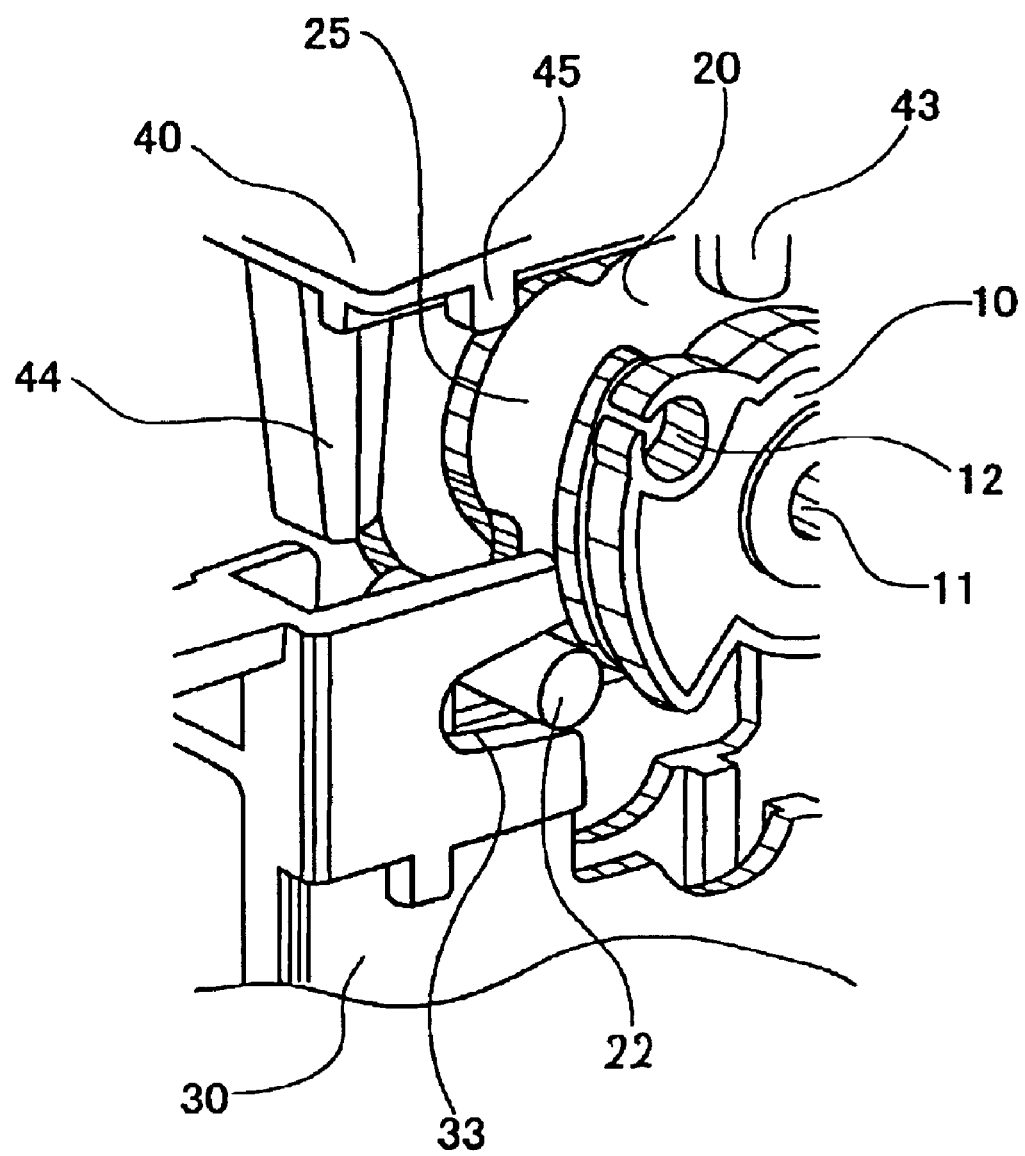

Now, for example, if the baby carriage 100 is to be folded on unlocking the folding mechanism 111, this is done by actuating the first pulley 10a that is connected to the folding mechanism 111 via the wire cable 2 is actuated. See FIGS. 8 to 10 which show movements when the switching plate 40 is operated. Sliding the switching plate 40 rightwards as shown in Fig, 8 causes the rotary plate 20 with the intermediary of the engagement pieces 43 and the piece of projection 24 made engagement therewith to be rotated clockwise as shown. As the rotary plate 20 is rotated, its engagement shaft 22 is allowed to enter into the engagement slot 33 and then to engage therewith as shown in FIG. 10.

Figure 11:
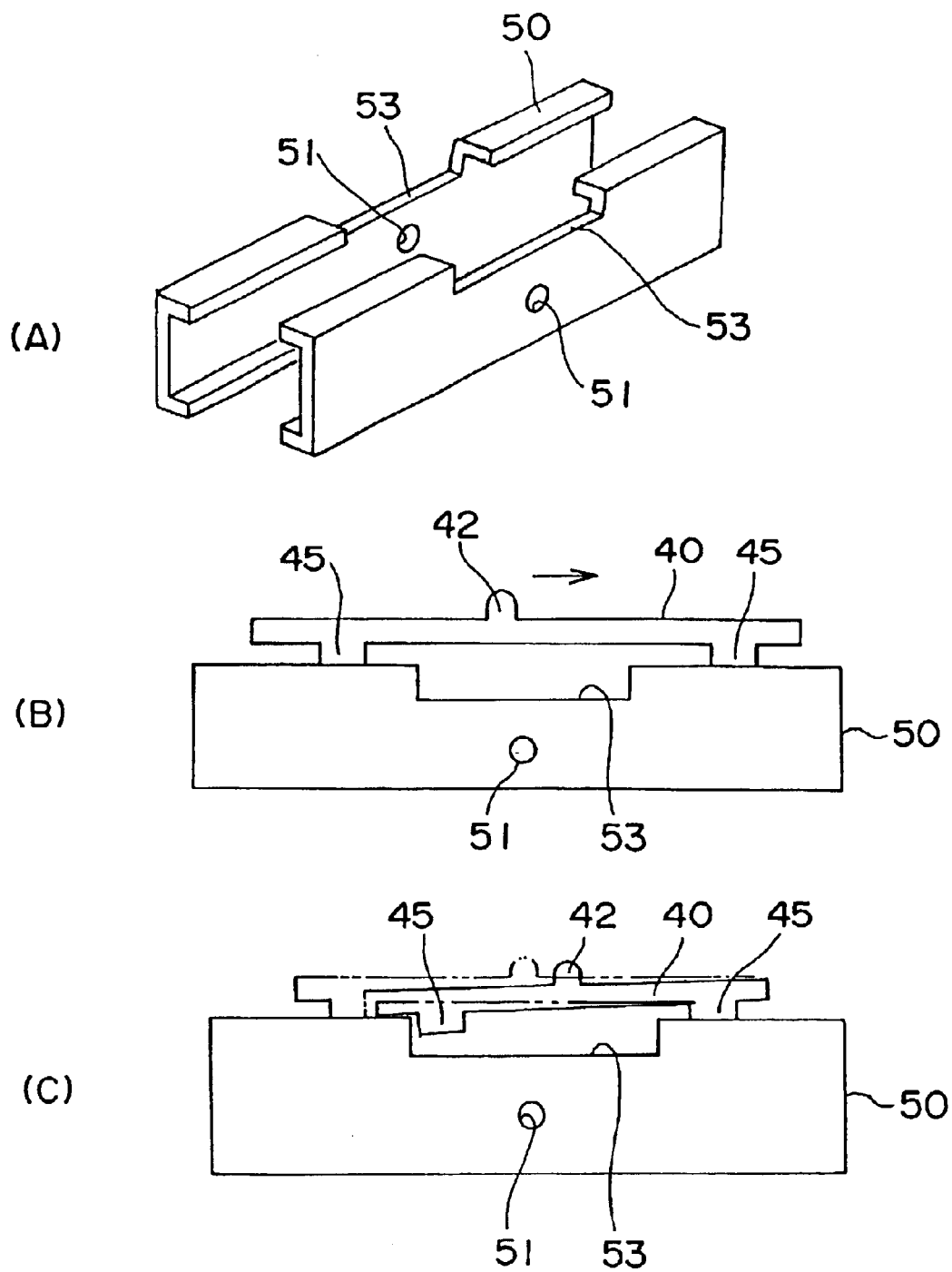
FIGS. 11A, 11B and 11C are diagrammatic views illustrating sequentially how the switching plate in the remote control device is locked.

Here, as shown in FIG. 11A, each frame half 50 in a central area of its upper surface is formed with a recess 53 while the switching plate 40 is further formed with a pair of projections 45 each adapted to engage with the recess 53. Thus, sliding the switching plate 40 as mentioned above (see FIG. 11B) brings one of the projections 45 into engagement with the recess 53 (see FIG. 11C), thereby locking the switching plate 40 at this slide position. Consequently, the rotary plate 20 becomes held at a pre-established angular position of rotation.

Figure 13:
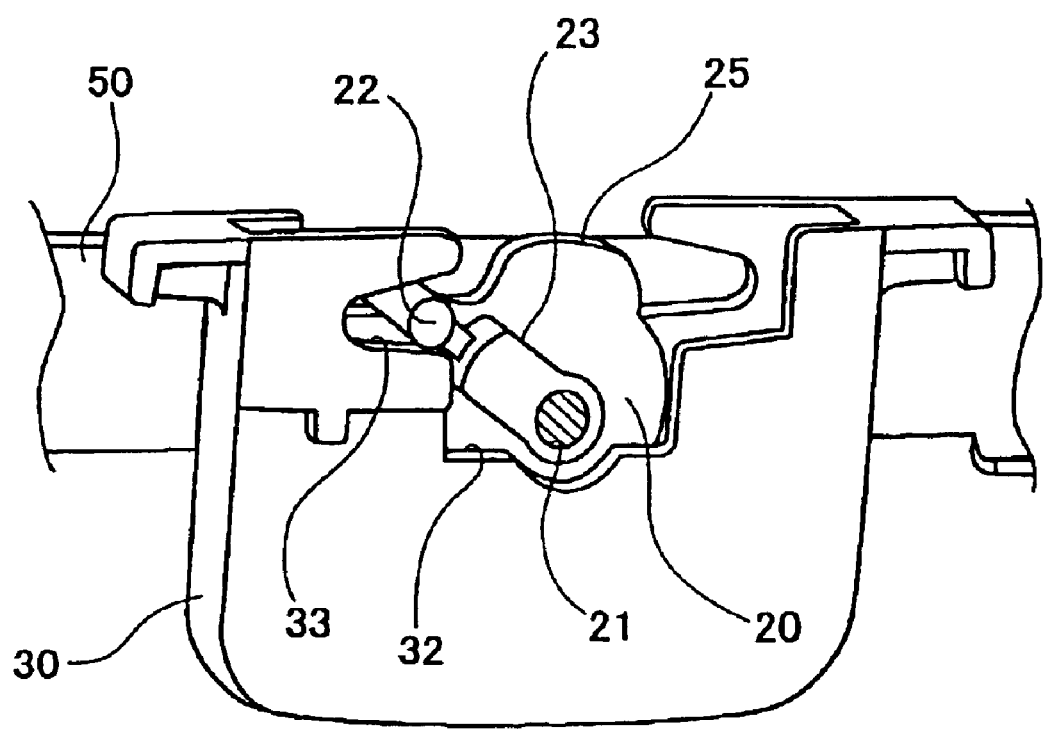
Figure 14:
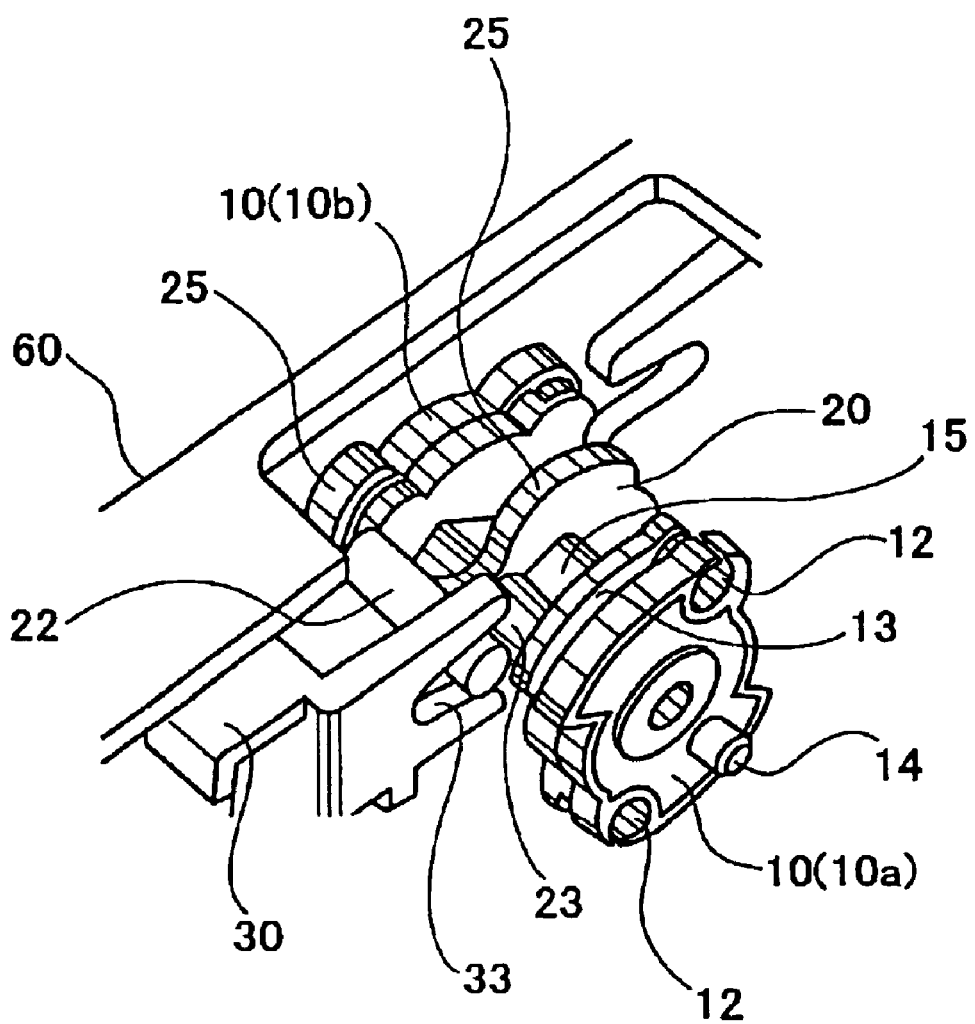

Next, the control lever 30 is actuated; namely grasped and pulled up. See FIGS. 12 to 14 which show movements when the control lever 30 is operated. In raising the control lever 30, the control lever 30 is guided by one of the guide projections 44 of the switching plate 40 while rising. Then, the rotary plate 20 is further rotated clockwise with the intermediary of the engagement shaft 22 in engagement with the engageable slot 33. With the rotary plate 20 so rated, its pressing element 23 acts to press the projection 15 of the pulley 10a and thereby to rotate the pulley 10a clockwise against the tension of the wire cable 2. The wire cable 2 is thus wound on the pulley 10a in its groove 13. As a result, the folding mechanism 111 is unlocked and made foldable. In the meantime, the other pulley 10b is held in its normal state.

Figure 12:
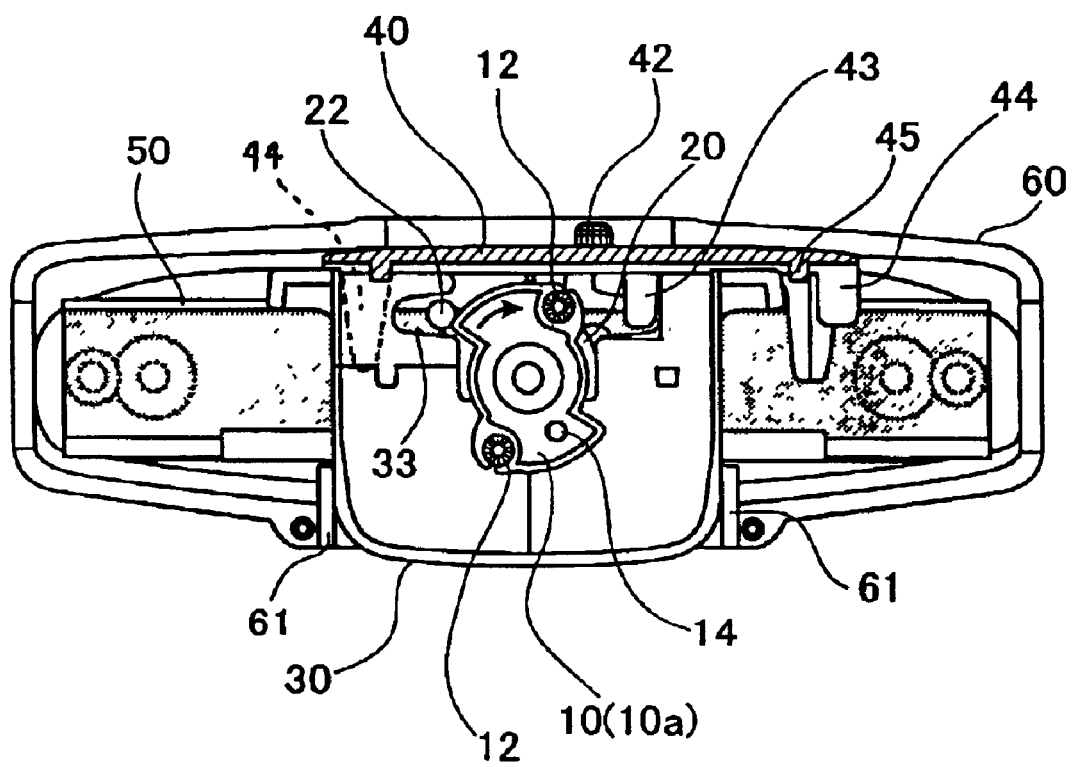
Figure 15:
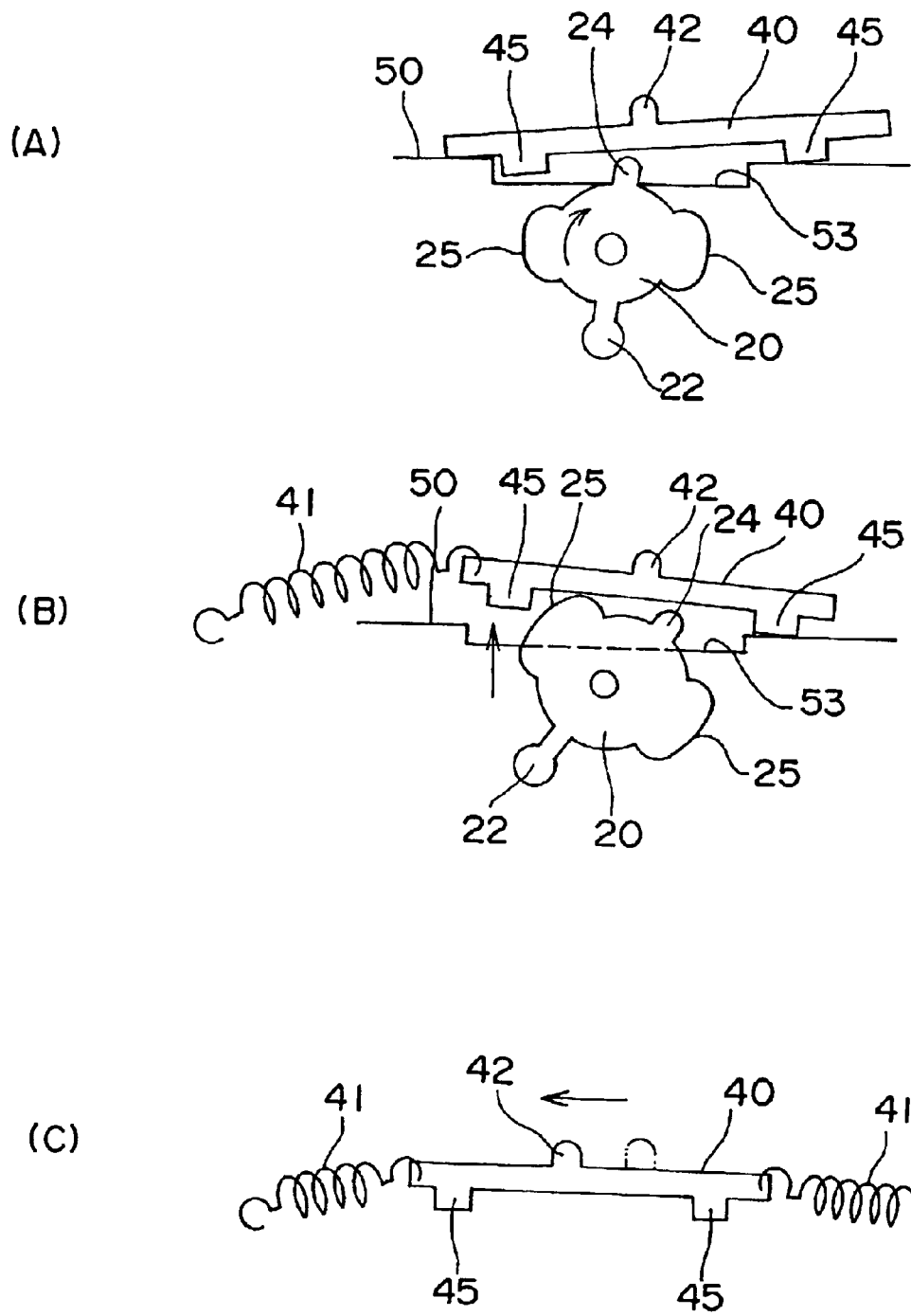
FIGS. 15A, 15B and 15C are diagrammatic views illustrating sequentially how the switching plate in the remote control device is unlocked.

The pulley 10a upon rotation by a pre-established angle is prevented from further clockwise rotation by reason of the fact that its stopper 14 contacts with the other end of the guide slot 52 (see FIGS. 3 and 4). Before the further clockwise rotation is so prevented, when the pulley 10a rotating in the direction of arrow shown in FIG. 15A comes to near its end point of rotation, one of the slide contact elements 25 of the rotary plate 20 makes a slide contact with the lower surface of the switching plate 40 as shown in FIG. 15B, thereby lifting the switching plate 40 from its one end side. This releases the switching plate 40 with the one projection 45 that has engaged with the recess 50 in the frame 50 from this slide locking. At this time, however, as shown in FIG. 12 the guide projections 44 of the switching plate then remain engaging with the control lever 30. Thereafter, detaching of operator's hand from the control lever 30 allows the control lever 30 to be returned to its normal position under the elastic force of the tension strings 34 (see FIG. 4), In turn, the return of the rotary plate 20 to its normal position likewise allows the pulley 10a to be returned to its normal position under the tension of the wire cable 2. Thus, upon the control lever 30 coming off the guide projections 44 of the switching plate 40, the switching plate 40 as well is allowed to restore its normal position under the elastic force of the springs 41 as shown in FIG. 15C.

Repeating the series of operations mentioned above once more permits the folding mechanism 111 to be locked.

On the other hand, if the push handle 112 is to be switched in position (as indicated by the two dot chain line in FIG. 1) on unlocking the handle switching mechanism 112, this is done by actuating the second pulley 10b that is connected to the handle switching mechanism 112 via the wire cable 3. In contrast to the unlocking of the folding mechanism 111 mentioned above, the switching plate 40 in the normal state is slit leftwards.

Sliding the switching plate 40 leftwards causes the rotary plate 20 with the intermediary of its engagement pieces 43 and the piece of projection 24 in engagement therewith to be rotated counterclockwise as opposed to the case of unlocking the folding mechanism 111. As the rotary plate 20 is rotated, its engagement shaft 22 is allowed to enter into the engagement slot 33 and then to engage therewith as shown in FIG. 10.

Sliding the switching plate 40 as mentioned above brings the other of the projections 45 into engagement with the recess 53, thereby locking the switching plate 40 at this slide position. Consequently, the rotary plate 20 becomes held at a pre-established angular position of rotation.

Next, in raising the control lever 30, the control lever 30 is guided by one of the guide projections 44 of the switching plate 40 while rising. Then, the rotary plate 20 is further rotated counterclockwise with the intermediary of the engagement shaft 22 in engagement with the engageable slot 33. With the rotary plate 20 so rated, its pressing element 23 acts to press the projection 15 of the pulley 10b and thereby to rotate the pulley 10b counterclockwise against the tension of the wire cable 2. The wire cable 2 is thus wound on the pulley 10b in its groove 13. As a result, the handle switching mechanism 112 is unlocked and made capable of switching the handle in position In this case as well, when the pulley 10b rotating comes to near its end point of rotation, the corresponding slide contact element 25 of the rotary plate 20 makes a slide contact with the lower surface of the switching plate 40, thereby lifting the switching plate 40 from its one end side. This releases the switching plate 40 with the one projection 45 that has engaged with the recess 50 in the frame 50 from this slide locking. At this time, however, the guide projections 44 of the switching plate then remain engaging with the control lever 30. Thereafter, detaching of operator's hand from the control lever 30 allows the control lever 30 to be returned to its normal position under the elastic force of the tension strings 34.

In turn, the return of the rotary plate 20 to its normal position likewise allows the pulley 10b to be returned to its normal position under the tension of the wire cable 2. Thus, upon the control lever 30 coming off the guide projections 44 of the switching plate 40, the switching plate 40 is allowed to restore its normal position under the elastic force of the springs 41.

Repeating the series of operations mentioned above once more permits the handle switching mechanism 112 to be locked.

As will be apparent from the foregoing description, the remote control apparatus 1 according to the present invention provides outstanding advantages in its operability. It permits the folding mechanism 111 and the handle switching mechanism 112 to be selectively unlocked with the use of a single control lever 20 in combination with a switching plate 40. Furthermore, making the control lever one 20 component of the device simplifies the device in its makeup. Then, the device is both smooth and to the purpose in operation, and excellent in usability.

Especially if the position (distance R) of an engagement shaft 22 and the position (distance r) of the projection 15 on a pulley 10, which determine their torques, respectively, are related to each other to satisfy the requirement R>r as mentioned above, the force required in manipulating the control lever 30 is effectively reduced, which makes the device easy to use and handle.

In sum, the present invention provides an improved remote control device connected to mutually independent controllable members, e.g., a folding and a handle switching mechanism in a baby carriage in a typical form of embodiment thereof, which device provides outstanding advantages in its operability. It permits the independent controllable members, e.g., the folding and handle switching mechanisms, to be selectively unlocked with the use of a single control lever in combination with a switching plate. Furthermore, making the control lever one component of the device simplifies the device in its makeup. Then, the device is both smooth and to the purpose in operation, and excellent in usability. Furthermore, setting up a large ratio in torque between the rotary plate and the switching plate on which the torque produced by the control lever when operated is acted, permits the force required in manipulating the control lever to be substantially reduced, which makes the device easy to use and handle.

Although the present invention has been described in terms of the presently preferred forms of embodiment, it is to be understood that such disclosure is purely illustrative and is not to be interpreted as limiting. For example, it is possible to change the ratio of the distance R to the distance r suitably as demands call for and to choose an optimum value in the practical use of the device. Consequently, without departing from the spirit and scope of the invention, various alterations, modifications and/or alternative applications of the invention will, no doubt be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A remote control device connected to at least two independent controllable members via wire cable means for locking and unlocking the controllable members, said device comprising:

a switching plate to selectively switch between controlling either one of said two independent controllable members for locking and unlocking; and a single control lever to lock and unlock one of the controllable members switched with said switching plate, wherein the other controllable member switched with said switching plate is locked and unlocked with said single control lever.

2. A remote control device connected to at least two independent controllable members via wire cable means for locking and unlocking said two independent controllable members, said wire cable means including a pair of wire cables having their respective one ends connected to said two independent controllable members, respectively, said device comprising:

a pair of pulleys rotatably supported by a shaft and connected to other ends of said wire cables, respectively, wherein said pulleys are alternatively rotatable by a rotary plate and each of said pulleys when so rotated is adapted to wind thereon an end portion of the wire cable associated therewith;

said rotary plate rotatably supported between said pulleys and coaxially therewith having a pair of pre-established rotational angular positions assumable thereby and related to said pulleys, respectively;

a switching plate operable to select one of said pulleys representative of a selected one of said two independent controllable members, said switching plate being adapted to drive said rotary plate to assume one of said pre-established rotational angular position at which said rotary plate is capable of actuating and then rotating said selected one pulley; and a control lever stroke-movable for rotationally driving said rotary plate from said pre-established angular position, thereby rotating said selected one pulley.

3. A remote control device as set forth in claim 2, wherein said rotary plate includes an engagement shaft adapted to engage with said control lever, and each of said pulleys includes a projection adapted to engage with said rotary plate, and wherein said engagement shaft is spaced from a center of rotation thereof by a distance greater than a distance by which said projection is spaced from an axis of rotation thereof.

4. A remote control device as set forth in claim 2, wherein said rotary plate is adapted to rotate said two pulleys in mutually opposite directions, and said two pulleys are adapted, to wind said wire cables thereon in mutually opposite directions, respectively.

5. A remote control device as set forth in claim 2, wherein said two wire cables are each kept taut under tension.

6. A remote control device as set forth in claim 2, wherein said switching plate is slidably movable bi-directionally and so is said rotary plate rotatable, in such a manner that said rotary plate is rotatable in a sense determined by a direction in which said switching plate is moved; said switching plate is lockable at each of the ends of its two slidable movements; and said rotary plate has a slide contact segment adapted to unlock the locked said switching plate.

7. A remote control device as set forth in claim 6, wherein said switching plate includes a guide projection operable to guide said control lever when said switching plate has reached the end of its slidable movement and said control lever has been shifted to its operable position; and said guide projection is also operable to engage with said control lever and thus to be caught thereby when said switching plate is restoring its normal position.

8. A remote control device as set forth in claim 7, said switching plate is energized by spring means so as to restore its normal position.

9. A remote control device as set forth in claim 8, wherein said control lever is energized so as to restore its non-operable position.

10. A baby carriage having a folding mechanism and a handle switching mechanism as two independent controllable members, wherein said folding and handle switching mechanisms are adapted to be locked and unlocked by a remote control device as set forth in any one of claims 1 to 9.

* * * * *